350-6.3            SR
         XR    3,628,781

United S[tates Patent]    [11] 3,628,781

[72] Inventor
[21] Appl. No. 863,647
[22] Filed    Oct. 3, 1969
[45] Patented  Dec. 21, 1971
[73] Assignee  Philamon Incorporated
              Westbury, N.Y.

[54] COMPOUND TINE FOR TUNING FORK OR THE LIKE
6 Claims, 3 Drawing Figs.

[52] U.S. Cl. .................................... 267/154,
                              267/160, 267/182
[51] Int. Cl. .................................... F16f 1/16
[50] Field of Search .......................... 267/154,
                              136, 137, 160, 182

References Cited
UNITED STATES PATENTS
2,793,028  5/1957  Wheeler ..................... 267/160

*Primary Examiner*—Drayton E. Hoffman
*Attorney*—Darby & Darby

ABSTRACT: A light modulator structure employs a cross compound tine tuning fork structure arranged to produce the effect that the ends of the tines have exaggerated rotational motion with respect to each other and this motion is exploited by mirrors secured to the ends of tines to scan over a relatively wide angle a light beam projected to reflect successively from the two mirrors. A similar compound structure is incorporated in a simple scale having no frictionally moving parts. The scale compound cantilever is parallel rather than crossed and substantially eliminates scale pan rotation.

PATENTED DEC 21 1971        3,628,781
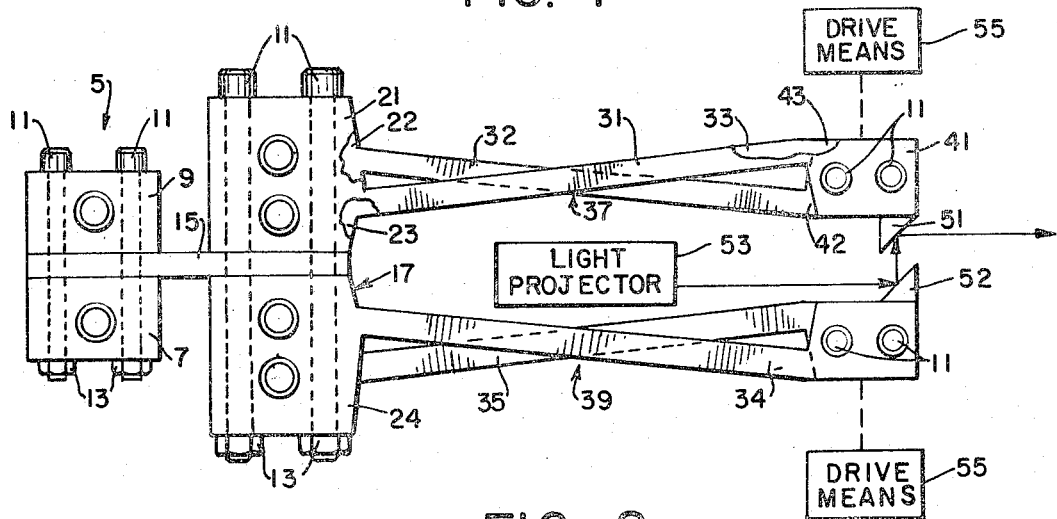
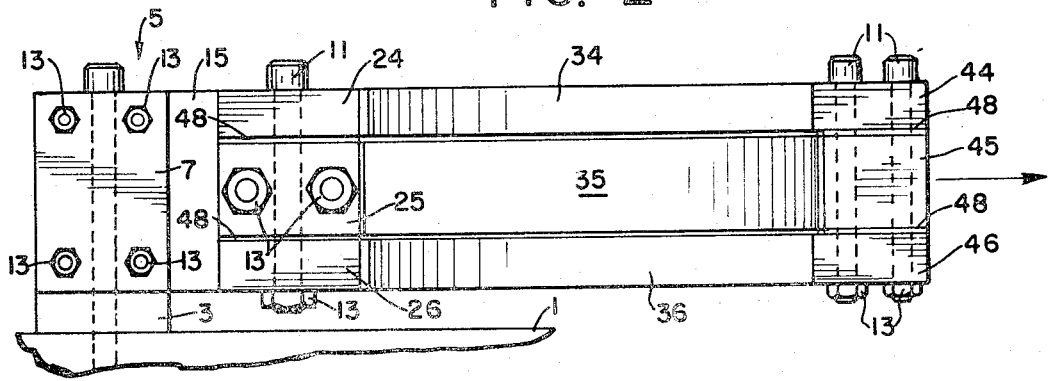
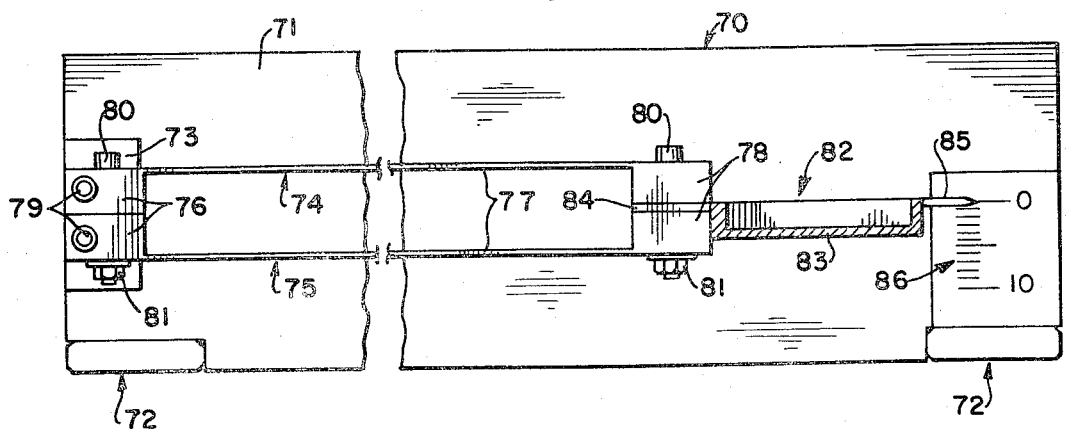
INVENTOR
BORIS F. GRIB
BY Darby & Darby
ATTORNEYS

COMPOUND TINE FOR TUNING FORK OR THE LIKE

This invention relates to structures such as a tuning fork wherein the tine of the tuning fork, for example, is replaced by a compound structure rather than a simple cantilever structure whereby the rotational movement at the end of the tuning fork tine may be caused to be quite different than a normal tuning fork structure. For example, the rotational movement may be accentuated to be as much as twice or more than that of a simple cantilever similarly deflected. The compound cantilever may also be applied to other applications and, for example, may provide a simple yet accurate pan scale which is completely devoid of any sliding, turning or rolling friction.

It is an object of the present invention to provide light-scanning apparatus in which light is reflected from a pair of reflectors each mounted on a tuning fork tine wherein the rotational motion of the tine ends and the reflectors secured thereto is exaggerated by a compound tine structure employed in the tuning fork.

Other objects and advantages of the invention in addition to those referred to above will be apparent from consideration of the following description in conjunction with the appended drawings in which:

FIG. 1 is a plan view of a light modulator according to the invention;

FIG. 2 is an elevational view of the light modulator apparatus of FIG. 1; and

FIG. 3 is an elevational view partially in section of a simple pan scale illustrating another application of the invention.

In FIGS. 1 and 2 there is shown a compound tuning fork structure in which the rotational motion of the ends of the tines is desired to be accentuated.

A conventional base structure 1 is provided for the tuning fork together with a platform 3 to permit the tuning fork structure to be free of interference with the base structure. The tuning fork of FIGS. 1 and 2 has a heel portion 5 including a pair of blocks 7 and 9 having sandwiched therebetween a web 15. The components of the tuning fork structure of FIGS. 1 and 2 are shown to be rigidly secured together by machine bolts 11 and nuts 13 for the purpose of illustration, but it will be understood that the components of the structure may be secured together by any other suitable means such as welding, brazing, soldering, etc.

The web 15 provides the sole support for the tuning fork proper and in particular the tine junction portion 17 of the tuning fork including rigid base portions 21, 22 and 23 of compound tine 37 and rigid base portions 24, 25 and 26 of compound tine 39.

Tine 39 includes three elongated flexible portions 34, 35 and 36 secured at their base end into a tine junction body 17 by virtue of the assembly of the rigid base portions 24, 25 and 26. Elongated portions 34, 35 and 36 are similarly secured rigidly together at their outer end through the rigid attachment of rigid outer portions 44, 45 and 46 by means of bolts 11 and nuts 13, or other suitable means. Clearance between elongated flexible portions 34, 35 and 36 is provided by shims 48.

Tine 37 is constructed as a mirror image of tine 39 and includes rigid base portions 21, 22 and 23, elongated flexible portions 31, 32 and 33 and rigid outer portions 41, 42 and 43.

Reflectors 51 and 52 are mounted near the ends of tines 37 and 39 respectively with their silvered reflecting surfaces facing each other and oriented preferably at 45° to the longitudinal axis of the tuning fork tines in their central or rest position. A light projector 53 of any conventional form projects a light beam striking reflectors 52 and 51 in that sequence. As will be seen from FIG. 1 when the tuning fork is stationary in its central position, the light striking successively reflectors 52 and 51 will not be changed in direction.

The tuning fork of FIGS. 1 and 2 may be driven by conventional electromagnetic drive means 55 (which is shown only schematically as it does not represent a novel aspect of the structure). It should be pointed out that only the tuning fork structure itself is shown in detail in FIGS. 1 and 2, it being understood that appropriate drive means, mounting means, optical apparatus and the like would be supplied in a conventional manner.

Further, it should be noted that the apparatus of FIGS. 1 and 2 in particular is not represented to scale in FIGS. 1 and 2. In general, the elongated flexible members 31, 32, 33, 34, 35 and 36 are shown as rather thick relative to their length, and although the thickness of these elements relative to their length could vary widely depending upon the desired resonant frequency of the tuning fork and other factors, it might more typically be at least approximately one to 20. The apparatus of FIGS. 1 and 2 operates to scan the light projected from light projector 53 in the following manner. As in an ordinary tuning fork, the tines 37 and 39 oscillate by alternately approaching each other and receding from one another. The ends of the tines of a normal tuning fork move in an arcuate path and have a rotational movement.

In the apparatus of FIGS. 1 AND 2, however, the rotational movement of the end portions of the tines of the tuning fork and hence of reflectors 51 and 52 is greatly accentuated by the linkage effect of the elongated flexible portions 31–36.

The rotational movement of the ends of the tines of the tuning fork of FIGS. 1 and 2 is approximately doubled in the structural arrangement shown. It can be shown that if the spacing of the elongated flexible elements 31–36 at the outer end of the tines is made less than, rather than equal to, the spacing of these members at the base of the tines, then the accentuation of the rotational effect will be increased by a greater amount. It will be seen, therefore, that one can increase the rotational motion of the ends of the tuning fork tines to a very considerable extent, keeping in mind in the usual case that one would not wish to produce flexure in the elongated flexible elements 31–36 which would exceed the elastic limit of the material.

For the purpose of explanation, assume that the tuning fork tine 39 as a whole flexes through an angle of approximately 1°. The end of tine 39 will accordingly rotate approximately 2° and the beam reflected from reflector 52 will be deflected through approximately 4°. Another 4° of deflection will be contributed by reflector 51 in the same manner and the total deflection of the light beam for 1° of tuning fork tine motion will be 8° approximately.

From foregoing explanation of FIGS. 1 and 2, it will be seen that a tuning fork is provided wherein the ends of the tuning fork tines have a rotational motion which is disproportionately large in comparison to the tine deflection and is useful, for example, in providing a light-scanning mechanism with the frequency stability which is inherently available from a tuning fork device.

Referring to FIG. 3 scale 70 includes an upright 71 provided with supports 72 for maintaining upright 71 in a vertical position. Upright 71 and support 72 together with the remaining elements of scale 70 may be formed of a steel alloy or other suitable material.

Mounted to upright 71 is a compound cantilever structure including members 74 and 75, each mounted on projection 73 to provide clearance with respect to upright 71.

Members 74 and 75 are rigidly secured together by any suitable means such as bolts 80 and nuts 81. Alternatively, members 74 and 75 may be secured together by soldering, brazing, adhesives, or the like. Members 74 and 75 may be secured to projection 73 and upright 71 by bolts 79 or suitable alternative means.

Each of the elements 74 and 75 comprises a rigid base portion 76, a thin elongated flexible portion 77 and a rigid outer portion 78. Rigidly secured to the rigid outer portion 78 is a pan 82 for the placement of objects to be weighed by the scale 70.

Pan 82 includes a cup-shaped portion 83 and a bracket portion 84 which provides a convenient means for rigidly securing pan 82 between rigid outer portions 78 of elements 74 and 75. A pointer 85 is located on pan 82 which reads against indicia of scale 86.

The compound cantilever structure provided by elements 74 and 75 in FIG. 3 assures that pan 82 will remain in a horizontal position over a wide range of deflection for the pan 82. In other words, pan 82 together with the rigid outer portions 78 of elements 74 and 75 experience virtually no rotational movement in the course of deflection of the pan 82 and consequently each point on pan 82 and rigid outer portions 78 describes an arc of equal radius. This means that the effective lever arm for any mass placed in pan 82 is the same regardless of its location in the pan, thus assuring proper and accurate weighing of the mass.

In contrast, if a scale were constructed similar to that of FIG. 3 but with an ordinary cantilever as the support for pan 82 rather than the compound cantilever of FIG. 1, the effective lever arm for a mass placed in pan 82 would depend upon how far to the right or to the left it were placed in the pan and accurate measurements would be impossible.

The parallelism of pan 82 with the base of upright 71 is adequately assured by forming the compound cantilever represented by the joinder of elements 74 and 75 in a symmetrical fashion with thin elongated elements 77 parallel in their unstressed position. To the extent that minor second order effects would cause pan 82 to rotate slightly out of parallelism during deflection, this can be compensated for by closing or widening the separation of thin elongated elements 77 at their outer end by decreasing or increasing the dimension of the rigid outer portions 78 of elements 74 and 75 (vertical dimension).

As suggested by FIG. 3, the length of thin elongated elements 77 relative to their spacing may be varied over a considerable range and a typical length to spacing ratio may be from 10 to 20 times. The length of elements 77 may be of the order of 100 times their thickness.

The width of each elongated element 77 should be several times their thickness, in a typical case 10 times their thickness.

From the foregoing description, it will be seen that an inherently accurate spring scale is provided by use of the compound cantilever structure as illustrated in FIG. 3 wherein there are no sliding, turning, rolling or otherwise frictionally moving parts which would detract from the accuracy of the scale. At the same time, the problem of providing a spring scale mechanism with an effectively constant lever arm for weights placed on the scale is quite adequately take care of.

It will be apparent to those of skill in the art that in addition to the variations and modifications of the invention suggested or illustrated herein, other modifications and variations will be apparent. Accordingly, the scope of the invention is not to be deemed to be limited to the variations shown or suggested but to include those resulting from the application of the skill of the art.

What is claimed is:

1. A tuning fork in the form of a dual compound cantilever structure for causing a pair of movable members to have accentuated rotational motion relative to a stationary reference plane comprising
    a first resiliently deformable body having at least two transposed similar elongated resiliently bendable portions,
    the ends of each of said bendable portions being respectively fixedly joined to enlarged rigid portions of said member,
    the first of said rigid portions being fixed to define a reference plane and the second being resiliently supported to have accentuated rotational motion relative to the first,
    a second resiliently deformable body substantially the same as the said first resiliently deformable body,
    and means for rigidly securing the respective first ones of said rigid portions of said resiliently deformable bodies in spaced relationship to provide a tuning fork structure in which each of the tines of the tuning fork comprises the free end of one of said resiliently deformable bodies.

2. Apparatus as claimed in claim 1 wherein said similar elongated resiliently bendable portions have a principal plane of resilience and their cross-sectional dimension perpendicular to said plane of resilience is at least three times as great as their dimension parallel to said plane of resilience.

3. Apparatus as claimed in claim 2 wherein the length of said similar elongated resiliently bendable portions in a direction perpendicular to said reference plane is at least 10 times the cross-sectional dimension of said similar elongated resiliently bendable portions parallel to said plane of resilience.

4. Apparatus as claimed in claim 1 wherein each deformable body there are three of said similar elongated resiliently bendable portions including two outer bendable portions and one inner bendable portion, the inner bendable portion being transposed relative to each of the outer bendable portions.

5. Apparatus as claimed in claim 1 wherein for each deformable body the spacings between said similar elongated resiliently bendable portions where they are joined to respective ones of said enlarged rigid portions are equal.

6. Apparatus as claimed in claim 1 wherein the portion of each said resiliently deformable body where said bendable portions are fixedly joined to said enlarged rigid portions is a homogeneous unitary portion of said resiliently deformable body.

* * * * *

PO-1050
(5/69)

UNITED STATES PATENT OFFICE
CERTIFICATE OF CORRECTION

Patent No. 3,628,781          Dated December 21, 1971

Inventor(s) BORIS F. GRIB

It is certified that error appears in the above-identified patent and that said Letters Patent are hereby corrected as shown below:

Claim 4, line 1, insert "for" before "each".

Signed and sealed this 9th day of July 1974.

(SEAL)
Attest:

McCOY M. GIBSON, JR.
Attesting Officer

C. MARSHALL DANN
Commissioner of Patents